(12) United States Patent
Stern et al.

(10) Patent No.: US 9,443,117 B2
(45) Date of Patent: Sep. 13, 2016

(54) SELF-OPTIMIZING METHOD OF AND SYSTEM FOR EFFICIENTLY DEPLOYING RADIO FREQUENCY IDENTIFICATION (RFID) TAG READERS IN A CONTROLLED AREA CONTAINING RFID-TAGGED ITEMS TO BE MONITORED

(71) Applicant: SYMBOL TECHNOLOGIES, LLC, Lincolnshire, IL (US)

(72) Inventors: Miklos Stern, Woodmere, NY (US); Benjamin J. Bekritsky, Modin (IL); Narendra Joshi, Lake Grove, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 701 days.

(21) Appl. No.: 13/715,305

(22) Filed: Dec. 14, 2012

(65) Prior Publication Data
US 2014/0167918 A1    Jun. 19, 2014

(51) Int. Cl.
*G06K 7/00*    (2006.01)

(52) U.S. Cl.
CPC ................... *G06K 7/0095* (2013.01)

(58) Field of Classification Search
CPC ............ G06K 3/00; G06K 7/00; G06K 7/01; G06K 7/0004; G06K 7/0008; G06K 7/0095; G06K 7/10; G06K 7/10376; G06K 7/10475; G06K 19/0716; G01S 1/02; G01S 1/028; G01S 1/68; G01S 13/75; G01S 13/765; G01S 13/876; G01S 13/878

USPC ............ 340/505, 514, 539.1, 539.16, 539.2, 340/539.21, 572.1, 572.8, 5.1, 10.1, 10.2, 340/10.3, 10.4, 10.5, 10.6; 370/328, 332; 455/422.1, 423, 446, 448

See application file for complete search history.

(56) References Cited

U.S. PATENT DOCUMENTS

| | | | |
|---|---|---|---|
| 7,030,761 B2 | 4/2006 | Bridgelall et al. | |
| 7,116,988 B2 * | 10/2006 | Dietrich et al. | ........... 455/456.1 |
| 8,077,041 B2 | 12/2011 | Stern et al. | |
| 2007/0099623 A1 | 5/2007 | Stephensen et al. | |
| 2007/0200686 A1 * | 8/2007 | Jung | .......................... 340/10.51 |
| 2007/0202811 A1 | 8/2007 | Chanowitz | |
| 2008/0266092 A1 * | 10/2008 | Campero et al. | .......... 340/572.1 |
| 2008/0278238 A1 | 11/2008 | Kimura | |
| 2008/0284600 A1 | 11/2008 | Drzaic et al. | |
| 2009/0184165 A1 | 7/2009 | Bertness et al. | |
| 2010/0001843 A1 | 1/2010 | Bae et al. | |
| 2010/0201488 A1 | 8/2010 | Stern et al. | |
| 2010/0201520 A1 * | 8/2010 | Stern et al. | ................ 340/572.1 |
| 2012/0161967 A1 | 6/2012 | Stern | |

OTHER PUBLICATIONS

PCT International Search Report Dated Jun. 18, 2014 for Counterpart Application PCT/US2013/71587.

* cited by examiner

*Primary Examiner* — Brian Wilson

(57) ABSTRACT

Radio frequency identification (RFID) tag readers are integrated with individual RFID tags to form integrated RFID units that are initially deployed to cover a controlled area with radio frequency (RF) coverage. A controller determines whether the RF coverage optimally covers the controlled area by controlling at least one of the integrated RFID units in the initial deployment to read the RFID tag integrated with at least another of the integrated RFID units. An interface reports when the RF coverage does not optimally cover the controlled area, and responsively guides a redeployment of at least one of initially deployed integrated RFID units to a subsequent deployment in which the RF coverage provided by the integrated RFID units optimally covers the controlled area.

18 Claims, 4 Drawing Sheets

SELF-OPTIMIZING METHOD OF AND SYSTEM FOR EFFICIENTLY DEPLOYING RADIO FREQUENCY IDENTIFICATION (RFID) TAG READERS IN A CONTROLLED AREA CONTAINING RFID-TAGGED ITEMS TO BE MONITORED

FIELD OF THE DISCLOSURE

The present disclosure relates generally to a self-optimizing method of, and system for, efficiently deploying radio frequency identification (RFID) tag readers in a controlled area containing RFID-tagged items to be monitored.

BACKGROUND

Radio frequency identification (RFID) technology is becoming increasingly important for logistics concerns, material handling and inventory management in retail stores, warehouses, distribution centers, buildings, and like controlled areas. An RFID system includes an RFID reader, also known as an RFID interrogator, which has a radio frequency (RF) transceiver and an antenna that emits RF waves generated by the transceiver over a coverage range. The RFID system also includes an RFID tag, which is a small transponder having a tag antenna, and is typically placed on, or associated with, an item, e.g., a product or its packaging, to be tracked. When the RFID tag of the item is located in the coverage range of the reader and receives the RF waves, the tag is activated. Once the tag has been activated, the tag sends RF waves containing identifying data back to the reader, thereby identifying the item to which the tag is attached, or with which the tag is otherwise associated. One form of the RFID tag modifies and reflects the waves emitted by the reader, using the modified and reflected waves to communicate with the reader, in a backscatter process. In another form of the RFID tag, the tag emits an RF signal which is detected by the reader.

There are three basic types of RFID tags. A passive tag receives all the energy required for its operation from the RF waves generated by the reader, and reflects some of the received energy as the passive tag communicates with the reader. A semi-active (also referred to sometimes as semi-passive) tag is powered by an on-board battery, but still communicates by reflecting some of the energy radiated by the reader. A reflected signal is modulated by changing the impedance of the tag antenna, thereby changing the ratio between the absorbed energy and the reflected energy. Since, in most cases, the coverage range of the RFID reader is limited by the amount of energy needed to power the passive tags, semi-active tags usually have a significantly larger coverage range even when operating the same reader under the same conditions since the tag does not need to derive its operating power from the energy radiated by the reader. An active tag is essentially a fully functional radio, with on-board power and a stand-alone transceiver. An active tag can be read at an even greater distance or coverage range from a reader as compared, for example, to a passive or a semi-active tag.

The RFID system is often used in an inventory monitoring application. For example, in order to take inventory of RFID-tagged items in a retail store, it is known for store personnel with handheld RFID readers to manually make rounds through an inventory area of the store. Since this manual inventory-taking process relies on store personnel to physically walk through the entire inventory area to read each RFID-tagged item over a significant amount of time, it is not very efficient, or accurate, and, in practice, may not be frequently performed.

To automate and improve the manual inventory-taking process, it is also known to arrange a plurality of RFID readers at fixed locations throughout the inventory area, and then, to allow the readers to automatically read whatever RFID-tagged items are in their respective coverage ranges. To help better locate the RFID readers and, in turn, the RFID-tagged items that the RFID readers "see", one can use one or more "beacon tags" or "fiducial tags". The beacon/fiducial tags are RFID tags that are not attached or associated with any inventory item, but instead, are permanently placed in known locations throughout the inventory area, e.g., around a door frame, or in walls, or a floor, or a ceiling, of a building, or on shelves and racks. Since the locations of the beacon/fiducial tags are fixed and known, the RFID system may determine the location of any particular RFID reader whose location is being determined based on which beacon/fiducial tags are detected by the RFID reader. As another example, it is known to enable an RFID reader to determine its own location by reading RFID-tagged items in its coverage range. As still another example, it is known to utilize a satellite-based global positioning system (GPS) technology to determine the locations of RFID readers.

As advantageous as such automatic inventory-taking systems have been, the deployment of the RFID readers may not optimally cover the inventory area. There may be duplication in RF coverage in one or more zones, and there may be gaps in the RF coverage in one or more other zones. Even if the deployment of the RFID readers does optimally cover the inventory area, inventory area layouts may change, one or more of the RFID readers may be moved and sometimes to random locations, the RFID-tagged items may be moved, and the GPS technology may not work well indoors. One or more of such actions or events will defeat any assurance that the RFID system will have adequate and contiguous RF coverage over the entire controlled inventory area. Knowing the exact location of each RFID reader, despite the occurrence of any such actions/events, improves manufacturing and distribution efficiency, and translates to a more effective competitive presence in the marketplace.

Accordingly, there is a need to efficiently and non-randomly deploy RFID readers in a controlled area to insure contiguous and optimal RF coverage throughout the entire controlled area, that is, not too many readers that might result in duplication of RF coverage, and not too few readers that might result in gaps or holes in the RF coverage, and, once the RFID readers are deployed, to dynamically monitor the locations of the RFID readers and/or of the RFID-tagged items in the controlled area to maintain the contiguous and optimal RF coverage, and to dynamically report on the status, or change in status, of such RF coverage, and to guide a user to deploy new RFID readers, or to redeploy one or more of the existing RFID readers to again achieve contiguous and optimal RF coverage in case any of the above-described changing actions/events occur.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
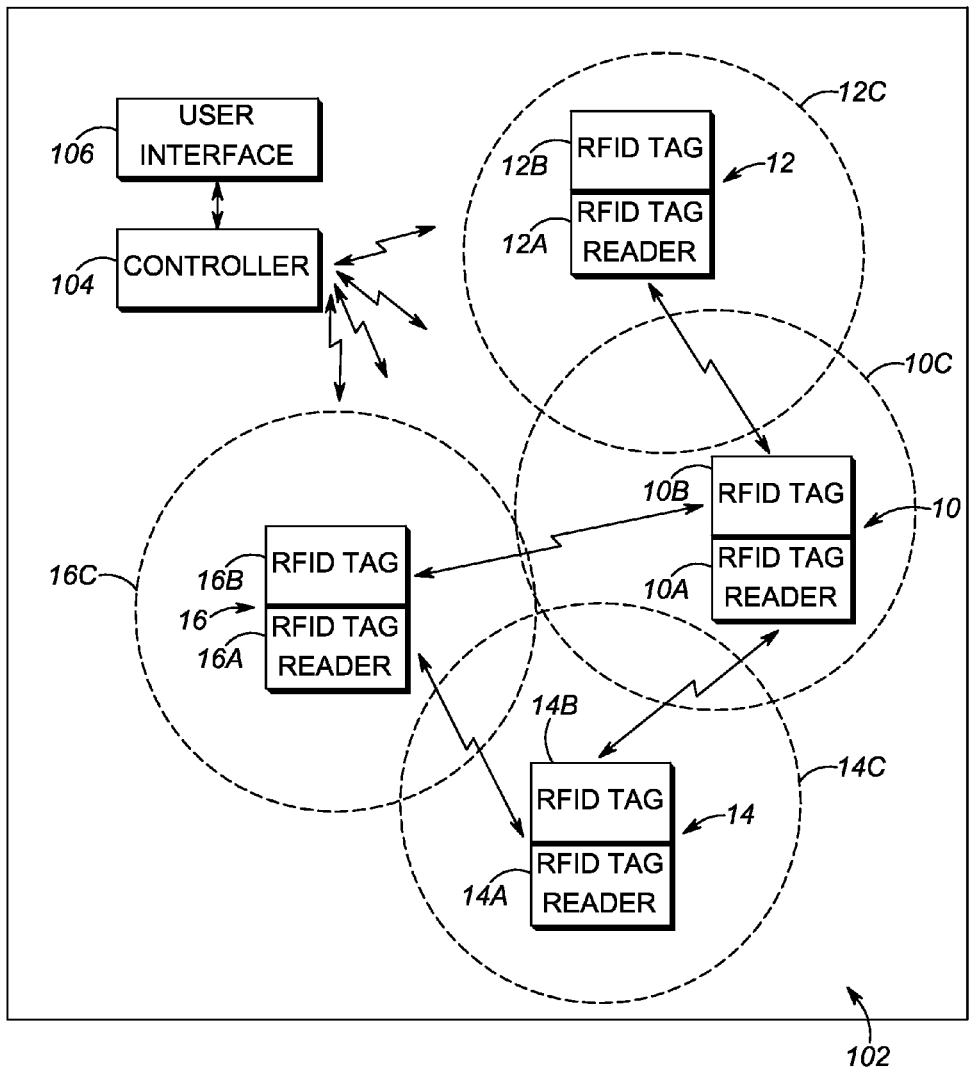
FIG. 1 is a schematic view of a self-optimizing system for, and method of, efficiently deploying radio frequency identification (RFID) tag readers in a controlled area in accordance with the present disclosure.

Skilled artisans will appreciate that elements in the figures are illustrated for simplicity and clarity and have not necessarily been drawn to scale. For example, the dimensions and locations of some of the elements in the figures may be exaggerated relative to other elements to help to improve understanding of embodiments of the present invention.

The system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

One aspect of this disclosure relates to a self-optimizing method of efficiently deploying radio frequency identification (RFID) tag readers in a controlled area containing RFID-tagged items to be monitored. The controlled area may be a retail store, a warehouse, or any other open or confined area in which the RFID-tagged items are to be monitored. Advantageously, each RFID-tagged item is associated with a passive tag for cost reasons, although semi-active and active tags could also be used. The method is performed by integrating the RFID readers with individual RFID tags to form integrated RFID units, preferably by either attaching each RFID tag to a respective RFID reader after reader manufacture, or by incorporating each RFID tag in a respective RFID reader during reader manufacture. The locations of the RFID readers in the controlled area will be able to be determined, at least in part, by reading their integrated RFID tags.

The method is further performed by initially deploying the integrated RFID units in the controlled area in an initial deployment in which the integrated RFID units cover the controlled area with radio frequency (RF) coverage. The initial deployment may be optimal or sub-optimal, e.g., there may or may not be duplication in the RF coverage in one or more zones, and/or there may or may not be gaps in the RF coverage in one or more different zones.

The method is still further performed by determining whether the RF coverage optimally covers the controlled area by controlling at least one of the integrated RFID units in the initial deployment to read the RFID tag integrated with at least another of the integrated RFID units. In other words, the RFID reader of each integrated RFID unit interrogates its coverage range to see if it can read, and therefore locate, the RFID tag of another integrated RFID unit. For example, in the case of deployment of two integrated RFID units, both readers can read each other's integrated tags in order to estimate the relative locations of the two integrated RFID units. When three or more integrated RFID units are deployed, all the readers attempt to read all the others' integrated tags and provide redundant positional information in order to better estimate the relative locations of all the integrated RFID units.

In addition, the RFID reader of each integrated RFID unit can interrogate its coverage range to see if it can read any RFID-tagged item. If a map of the controlled area exists which indicates known locations of the RFID-tagged items, then reading such RFID-tagged items assists in locating the integrated RFID units.

The method is yet further performed by reporting when the RF coverage does not optimally cover the controlled area, and, in response to such reporting, by guiding a redeployment of at least one of initially deployed integrated RFID units to a subsequent deployment in which the RF coverage provided by the integrated RFID units optimally covers the controlled area. Advantageously, the reporting conveys positional information concerning duplication of the RF coverage, and/or gaps in the RF coverage, and/or changes in layout of the controlled area, and/or changes in location of the RFID-tagged items. The positional information can be used in creating a planogram of the controlled area, in which the locations of the deployed integrated RFID units and the RFID-tagged items are depicted in the controlled area.

The method continuously monitors the initial and subsequent RFID reader deployment for optimum coverage, and reports any changes along with specific recommendations where to deploy one or more new RFID readers, or where to move one or more of the existing RFID readers, in response to the changes, in order to optimize the RF coverage. Preferably, each such change persists for a minimum time duration before any report is issued.

Still another aspect of this disclosure relates to a self-optimizing system for efficiently deploying radio frequency identification (RFID) tag readers in a controlled area containing RFID-tagged items to be monitored. The system includes a plurality of integrated RFID units formed by integrating the RFID tag readers with individual RFID tags. The integrated RFID units are initially deployed in the controlled area in an initial deployment in which the integrated RFID units cover the controlled area with radio frequency (RF) coverage. A controller is provided for determining whether the RF coverage optimally covers the controlled area by controlling at least one of the integrated RFID units in the initial deployment to read the RFID tag integrated with at least another of the integrated RFID units. An interface is also provided for reporting when the RF coverage does not optimally cover the controlled area, and for guiding, in response to the reporting, a redeployment of at least one of initially deployed integrated RFID units to a subsequent deployment in which the RF coverage provided by the integrated RFID units optimally covers the controlled area.

Turning now to the drawings, FIG. 1 depicts a simplified depiction of a self-optimizing method of efficiently deploying radio frequency identification (RFID) tag readers to establish an RFID-based inventory monitoring system 100 in a controlled area 102. The controlled area 102 may be a retail store, a warehouse, or any other open or confined area in which RFID-tagged items (illustrated in FIG. 3) are to be monitored. Advantageously, each RFID tag on an RFID-tagged item is a passive tag, which is less expensive than an active tag or a semi-active tag.

The system 100 includes a controller 104, a user interface 106, and a plurality of integrated RFID units 10, 12, 14, and 16. Each RFID unit 10, 12, 14, and 16 includes an individual RFID tag reader 10A, 12A, 14A, and 16A integrated with an individual RFID tag 10B, 12B, 14B, and 16B that respectively identifies the RFID tag reader 10A, 12A, 14A, and 16A with which the RFID tag 10B, 12B, 14B, and 16B is integrated. Each RFID reader 10A, 12A, 14A, and 16A, also known as an RFID interrogator, has an RF transceiver and an antenna that emits RF waves generated by the transceiver over a coverage range 10C, 12C, 14C, and 16C (depicted by circles in FIG. 1) in which an RFID-tagged item can be read. In particular, the circles indicate the coverage areas of the readers 10A, 12A, 14A, and 16A as regards to reading passive tags on the RFID-tagged items. If the readers were to read semi-active tags on the RFID-tagged items, then the coverage areas with respect to those semi-active tags would be typically larger in area. Even larger coverage areas are possible if active tags on the RFID-tagged items were interrogated by the readers.

Each RFID tag 10B, 12B, 14B, and 16B also includes an antenna, and could be a semi-active tag or an active tag, but, preferably, is a semi-active tag. Each RFID tag 10B, 12B, 14B, and 16B is either attached to a respective reader 10A, 12A, 14A, and 16A after manufacture, or is incorporated in the respective reader 10A, 12A, 14A, and 16A during manufacture. Although only four integrated RFID units 10, 12, 14, and 16 are illustrated in FIG. 1, the number of integrated RFID units may be any integer number, N, where N may be from 1 to potentially hundreds or more of integrated RFID units. It is to be understood that the integrated RFID units 10, 12, 14, and 16 need not be identical to each other, and may have different architectures of readers 10A, 12A, 14A, and 16A, and may have different architectures of RFID tags 10B, 12B, 14B, and 16B.

The controller 104 is one or more computers or servers that is in wired, wireless, direct, or networked communication with the interface 106 and with the integrated RFID units 10, 12, 14, and 16. The interface 106 provides a human/machine interface, e.g., a graphical user interface (GUI), that presents information in pictorial and/or textual form (e.g., representations of locations of the integrated RFID units 10, 12, 14, and 16, as described below) to a human user, and to initiate and/or alter the execution of various processes that may be performed by the controller 104. The controller 104 and the interface 106 may be separate hardware devices and include, for example, a computer, a monitor, a keyboard, a mouse, a printer, and various other hardware peripherals, or may be integrated into a single hardware device, such as a mobile smartphone or portable tablet or laptop computer. Furthermore, the user interface 106 can be in a smartphone, or tablet, etc, while the controller 104 may be a computer, either located at the premises, at some other location, or can be hosted in a cloud server. The controller 104 and the interface 106 may be co-located at, or remotely located from, the controlled area 102. The controller 104 advantageously includes a wireless RF transceiver that communicates with the integrated RFID units 10, 12, 14, and 16. For example, Wi-Fi and Bluetooth® are open wireless standards for exchanging data between electronic devices.

The integrated RFID units 10, 12, 14, and 16 may be powered from wall outlets, powered over the Ethernet (POE), or can be battery powered. The integrated RFID units 10, 12, 14, and 16 can be mounted on the ceiling; under or above ceiling tiles or floor tiles; on, in, or behind a wall; or in any other manner available and desirable by the circumstances of a particular deployment. In case the integrated RFID units 10, 12, 14, and 16 have battery power and wireless connectivity, these integrated RFID units are totally tetherless, and can be easily placed anywhere in the controlled area, as described below, e.g., on the ceiling, on the walls, or on or under shelves and racks. The completely tetherless units offer complete flexibility in their placement anywhere inside the controlled area, as determined by their needs, and by the esthetics. For instance, they may be advantageously deployed under or above shelves, tables, and racks, out of human view.

Figure 3:
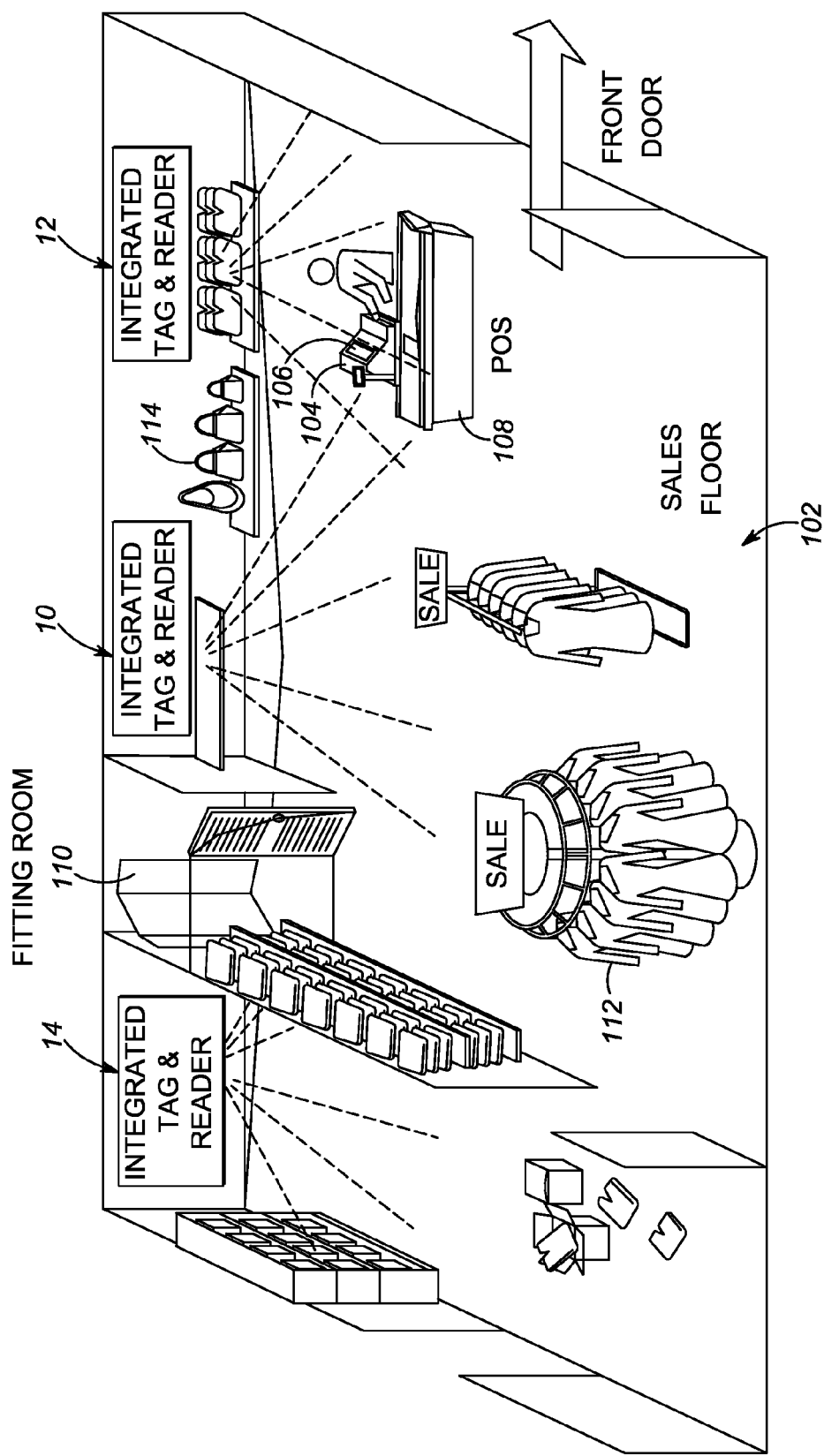
FIG. 3 is a perspective, schematic view of the system of FIG. 1 in a retail store, especially for inventory monitoring of RFID-tagged items.

FIG. 3 depicts an exemplary depiction of the system 100 after the integrated RFID units 10, 12 and 14 have been initially deployed in the controlled area 102 of a retail sales floor having a point-of-sale (POS) station 108 at which the controller 104 and the interface 106 may be provided, a fitting room 110, and a plurality of RFID-tagged items, e.g., clothes 112, handbags 114, etc., which are arranged on shelves, hangers, racks, on the floor, etc. As previously noted, each RFID-tagged item 112, 114 is preferably associated with a passive tag for cost reasons. To simplify the drawing, only three deployed integrated RFID units 10, 12 and 14 have been illustrated, and although they have been shown as being mounted overhead in a ceiling, they can be mounted anywhere in the controlled area 102. For example, if the integrated RFID units 10, 12 and 14 are battery-operated, then they can be placed on the undersides of shelves, or underneath racks, and, in general, hidden from public view. The dashed lines schematically illustrate the coverage ranges of the deployed RFID units 10, 12 and 14.

Initial deployment of the integrated RFID units 10, 12 and 14 involves positioning and mounting the integrated RFID units in a spaced-apart relationship anywhere in the controlled area 102, with the goal of enabling the integrated RFID units to entirely cover the controlled area 102 with radio frequency (RF) coverage. The initial deployment may be optimal or sub-optimal, e.g., there may or may not be duplication in the RF coverage in one or more zones, and/or there may or may not be gaps in the RF coverage in one or more different zones. At this point, there are no changes in the layout of the controlled area 102, as well as no changes in the locations of the RFID-tagged items 112, 114.

The controller 104 determines whether the RF coverage optimally covers the controlled area 102 by controlling at least one of the integrated RFID units 10, 12 and 14 in the initial deployment to read the RFID tag integrated with at least another of the integrated RFID units 10, 12 and 14. For example, the RFID reader 10A of the integrated RFID unit 10 interrogates its coverage range to see if it can read, and therefore locate, the RFID tag 12B of the integrated RFID unit 12. As another example, in the case of deployment of two integrated RFID units 10, 12, both readers 10A, 12A can read each other's integrated tags 12B, 10B in order to estimate the relative locations of the two integrated RFID units 10, 12. When three or more integrated RFID units 10, 12 and 14 are deployed, all the readers 10A, 12A, 14A attempt to read all the others' integrated tags 14B, 12B and 10B and provide redundant positional information in order to better estimate the relative locations of all the integrated RFID units 10, 12 and 14.

In addition, the RFID reader 10A, 12A, 14A of each integrated RFID unit 10, 12 and 14 can interrogate its coverage range to see if it can read any RFID-tagged item 112, 114. If a map of the controlled area 102 exists which indicates known locations of the RFID-tagged items 112, 114, then reading such RFID-tagged items 112, 114 assists in locating the integrated RFID units 10, 12 and 14.

The interface 106 reports when the RF coverage does not optimally cover the controlled area 102, and, in response to such a report, guides a redeployment of at least one of initially deployed integrated RFID units to a subsequent deployment in which the RF coverage provided by the integrated RFID units 10, 12 and 14 optimally covers the controlled area 102. Advantageously, the report conveys positional information, e.g., by a display on a monitor screen, concerning duplication of the RF coverage, and/or gaps in the RF coverage, and/or changes in layout of the controlled area 102, and/or changes in location of the RFID-tagged items 112, 114. The positional information can be used in creating a planogram, as described below, of the controlled area 102, in which the locations of the deployed integrated RFID units 10, 12 and 14 and the RFID-tagged items 112, 114 are depicted in the controlled area 102 on the monitor screen.

The controller 104 continuously monitors the initial and subsequent RFID reader deployment for optimum coverage, and the interface 106 automatically reports any changes along with specific recommendations where to deploy one or more new RFID readers 16, or where to move one or more of the existing RFID readers 10, 12 and 14, in response to the changes, in order to optimize the RF coverage. Preferably, each such change persists for a minimum time duration before any report is issued. This is desirable to avoid being overwhelmed by reports that may arise from momentary changes in the controlled area 102.

Furthermore, it is also desirable to set a threshold on the minimum level of sub-optimization of the RF coverage, so that minor changes do not generate reports. For instance, duplicate reads that only effect a small percent of the RFID-tagged items 112, 114 do not need to be reported. However, lack of coverage is likely to be an issue, even if it only affects a small percent of the RFID-tagged items 112, 114. These thresholds should be user adjustable parameters, with some preset numbers provided out-of-the-box by the system 100.

One issue that can arise involves multiple readers 10A, 12A and 14A covering the same RFID-tagged items 112, 114, referred to herein as duplication in RF coverage. Duplication in RF coverage, in this context, means that the same RFID-tagged item 112, 114 is being read by two or more readers. Thus, if the same RFID-tagged item 112, 114 is seen by more than one RFID reader, then the controller 104 can make a determination regarding its acceptability. If there is a small overlap between adjacent RFID readers, then that is likely to be acceptable, and, in some cases, even desirable, since that helps the controller 104 in determining the locations of RFID-tagged items 112, 114 more accurately, and it ensures better inventory accuracy.

However, if two or more readers cover the same RFID-tagged item 112, 114 completely, it may be advantageous for the controller 104 to recommend the removal of redundant RFID readers from that particular area. The controller 104 can also determine that by changing the location of one or more of the RFID readers, then other RFID readers may become redundant, and can be removed from the controlled area. The distance between an RFID reader and an RFID tag can be determined by advanced algorithms that use as their input the following information: RFID tag item data seen by the readers, the number of times the tags on the items are read by the various readers, signal strength, phase-frequency algorithms, time of flight, and triangulation that help determine the distance of the tags on the items being read from each RFID reader. In addition, the RFID readers also read the RFID tags integrated with the other readers and, hence, can determine approximate relative distance and location of the other RFID readers employing the same methods used to determine the distance and location of RFID tags attached to the RFID-tagged items; namely, read rate, signal strength, phase-frequency methods, time of flight, triangulation, etc. Other inputs to this determination are fiducial tags placed at known locations throughout the controlled area. Furthermore, the controller 104 can take into account the known location of the RFID-tagged items, if a planogram or map of the controlled area is available.

One issue that can arise is when an RFID-tagged item 112, 114 is not being seen by any reader, thus creating gaps or holes in the RF coverage. The deployment of the readers builds a network of integrated RFID units that "see" each other. If there is a significant change in this network over time, then that is an indication that there have been changes in the layout of the controlled area or in the reader deployment. Another indication is when one or more integrated RFID units see different RFID-tagged items from the ones they saw before. Both of these indications essentially provide information about change, which can result in either duplication in the coverage, or gaps in the RF coverage, or just simply a rearrangement of readers without any problems.

Gaps in the RF coverage can determined when the network of the integrated RFID units, which read each others' RFID tags, do not connect in a seamless way, but indicate that some integrated RFID units that should be neighboring are not connected on the network. Another indication is when RFID-tagged items, which have been read in the past by one or more readers, are not seen any longer by any reader. This can be further aided by information available from a planogram. If RFID-tagged items indicated on the planogram are not seen by any of the readers, then there must be gaps in the RF coverage.

Whether the controller 104 detects duplication or gaps in the RF coverage, the interface 106 provides recommendations for the best locations for the reader deployment, and this deployment can be indicated in a report, or on a map that can be displayed on a computer screen, or on a portable computer device used to aid personnel deploying the readers. As the controller continually tries to improve and optimize the reader layout, the redeployment process may be iterative. The controller is also capable of indicating the severity of the duplication or gap problem in the RF coverage. For instance, large gaps in the RF coverage are indicated as critical. Minor gaps in the RF coverage may be indicated as being less critical, while duplication in the RF coverage can be indicated as a suggestion for optimization, rather than a warning.

Figure 2:
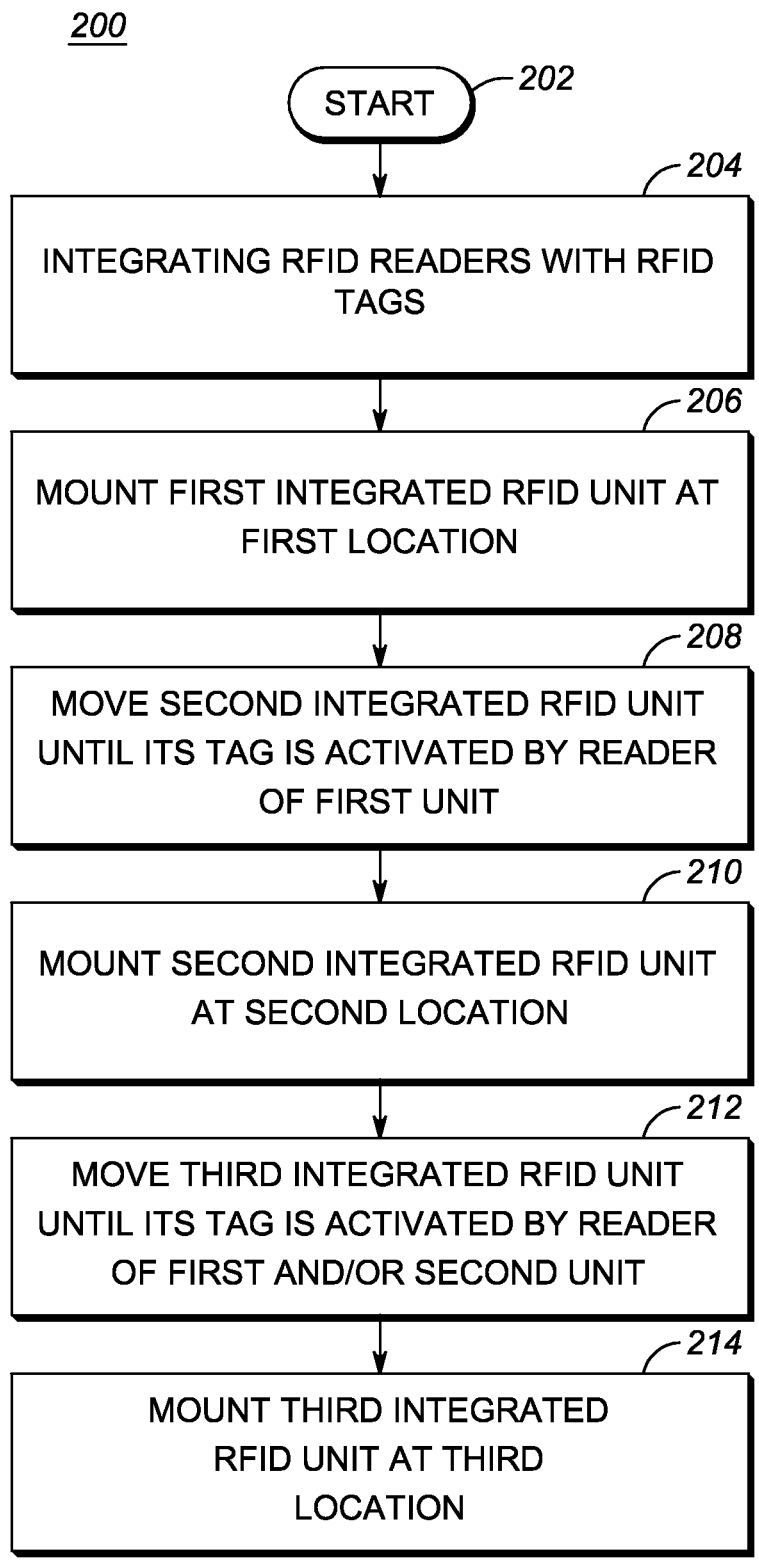
FIG. 2 is a flow chart depicting steps performed in accordance with one embodiment of a method of deploying the RFID tag readers of FIG. 1.

Rather than initially deploying the integrated RFID units all at once, the integrated RFID units can be initially deployed, one at a time. Thus, as shown in the flow chart 200 of FIG. 2, beginning at start block 202, each RFID reader is integrated with an RFID tag (block 204) to form an integrated RFID unit, and then, a first integrated RFID unit 10 is mounted at a first location in the controlled area 102 at block 206. For example, an installer may enter information into the controller 104 (e.g., via user interface 106), which indicates the physical first location of the first integrated RFID unit 10 within the controlled area 102.

Alternatively, the system 100 can automatically determine the first location of the first integrated RFID unit 10, or the locations of other integrated units, by reading fiducial tags placed at known locations in the controlled area. Yet another possibility is that each unit reads the tags on the items in its vicinity within its coverage range. If the system has access to a planogram of the controlled area, then the controller 104 can determine where a respective unit is located from the items that it "sees". Although entering a known location is likely to be more accurate than relying on fiducial tags, which is still more accurate than relying on the planogram, nevertheless, the latter options can provide more automation, and require less human intervention. Furthermore, two or more of the above methods can be combined to provide additional accuracy in registering the reader location.

Thereupon, the installer may move a second integrated RFID unit 12 relative to the first integrated RFID unit 10 in the controlled area 102 until the tag 12B receives the RF waves transmitted by the RFID reader 10A, and the RFID tag 12B is activated (block 208). Once the RFID tag 12B has been activated, the RFID tag 12B sends RF waves back to the RFID reader 10A, which can then determine the approximate location of the integrated RFID unit 12. Reader 10A then communicates with the controller 104, for example, either via local or wide area communication, or via any other communication method available. During this communication with the controller 104, the reader 10A provides its best estimate of the distance and location of integrated RFID unit 12. Alternatively, the integrated RFID unit 10 can provide raw data to the controller 104, and all the distance and location calculations are computed at the controller 104.

In parallel, the RFID reader 12A can also be operational, and activate the RFID tag 10B on the integrated RFID unit 10. This additional piece of information can also be provided to the controller 104, which then can use and compare both data points to obtain the best location estimates possible. Thus, both RFID readers 10A, 12A can try to read the tags 12B, 10B on each other's RFID units, thus increasing the likelihood of accurate information.

In addition, both the RFID readers 10A, 12A can also provide data to the controller 104 about other tags that they read in the controlled area 102. Such other tags may include fiducial RFID tags with known locations, as well as tags attached to the item or merchandise in the controlled area. Using all the data available to the controller 104, the controller 104 calculates the best estimate of the locations of the integrated RFID units 10 and 12. The controller 104 also calculates the optimum second location for the second integrated RFID unit 12 based on the current first location of the first integrated RFID unit 10, and of the data, and the controller 104 instructs the user via the user interface 106 to place the integrated RFID unit 12 at the calculated optimum second location (block 210).

The initial deployment is repeated for any number of additional integrated RFID units 14, 16, etc. For example, a third integrated RFID unit 14 may be moved relative to the first and second integrated RFID units 10, 12 in the controlled area (block 212), and the third integrated RFID unit 14 may be mounted at a third location in the controlled area 102 in response to activation of the RFID tag 14B (block 214).

In a variant method, the installer may enter information into the controller 104 (e.g., via user interface 106), which indicates the physical first and second locations of the first and second integrated RFID units 10, 12 within the controlled area 102. Thus, the locations of the RFID units 10, 12 are known. Thereupon, the installer may move the third integrated RFID unit 14 relative to the first and second integrated RFID units 10, 12 to some location in the controlled area 102. If the RFID unit 14 is "seen" only by the RFID unit 10, then the RFID unit 14 must be on the side of the RFID unit 10 opposite to the side that the RFID unit 12 is on. If the RFID unit 14 is "seen" only by the RFID unit 12, then the RFID unit 14 must be on the side of the RFID unit 12 opposite to the side that the RFID unit 10 is on. If the RFID unit 14 is "seen" by both the RFID unit 10 and the RFID unit 12, then the RFID unit 14 must be located somewhere between the RFID unit 10 and the RFID unit 12. If the RFID unit 14 is "not seen" by either the RFID unit 10 or the RFID unit 12, then the RFID unit 14 must be located far away from both the RFID unit 10 and the RFID unit 12, and additional units need to be placed between the RFID unit 10 and the RFID unit 12 to complete the RF coverage.

The controller 104 determines a distance between any two of the locations of the integrated RFID units by measuring a read rate value and/or a return signal strength indicator value and/or a phase value of a reflected signal versus frequency, for the activated RFID tag, or any other method known in the art to measure distance based on a received radio signal. The receiver sensitivities of the RFID units can be adjusted to set the appropriate distances between the units. If denser RF coverage is preferred, then the sensitivities can be reduced, that is, the receiver requires a stronger signal to see an RFID tag. In principle, the sensitivities can be adjusted automatically by specifying the coverage preferences. Alternatively, the transmit signal strength can be reduced, in which case, tags that are farther away will not readily respond to the interrogation signal. Alternatively, higher sensitivities, higher read rate values, or higher signal strength values can be used to obtain less dense coverage. The interface 106 conveys information concerning where to deploy and position the integrated RFID units to avoid duplicate RF coverage and gaps in the RF coverage in the controlled area, and where to rearrange the already positioned integrated RFID units.

As the deployment proceeds, and as additional integrated RFID units are being deployed, the controller 104 may determine, based on the information that the controller 104 is obtaining from the readers, that possibly the deployment of some of the already deployed integrated RFID units was not optimum, in which case, the controller 104 can instruct the user via the interface 106 to redeploy such already deployed units in different locations. The information obtained from the readers consists of data from the tags read on the integrated RFID units, and/or any available fiducial tags, and/or tags read on the items being tracked in the controlled area. The user interface advantageously can include a map of the layout of the controlled area. The map can show the locations of the deployed RFID units, as well as the locations where additional RFID units should be deployed.

Advantageously, the user has the option to override the recommendations of the controller 104, and can deploy the RFID units at any location. The controller 104 can automatically determine the locations of any deployed RFID units, but the user can be given the option to manually enter the locations of deployed RFID units, in case the location estimates of the controller 104 are not accurate enough. For example, the user can simply touch a reader icon on a touchscreen interface 106, and then move the icon to a desired location on the touchscreen interface 106, in which case, the controller 104 can automatically update its location estimates of the deployed RFID units.

Figure 4:
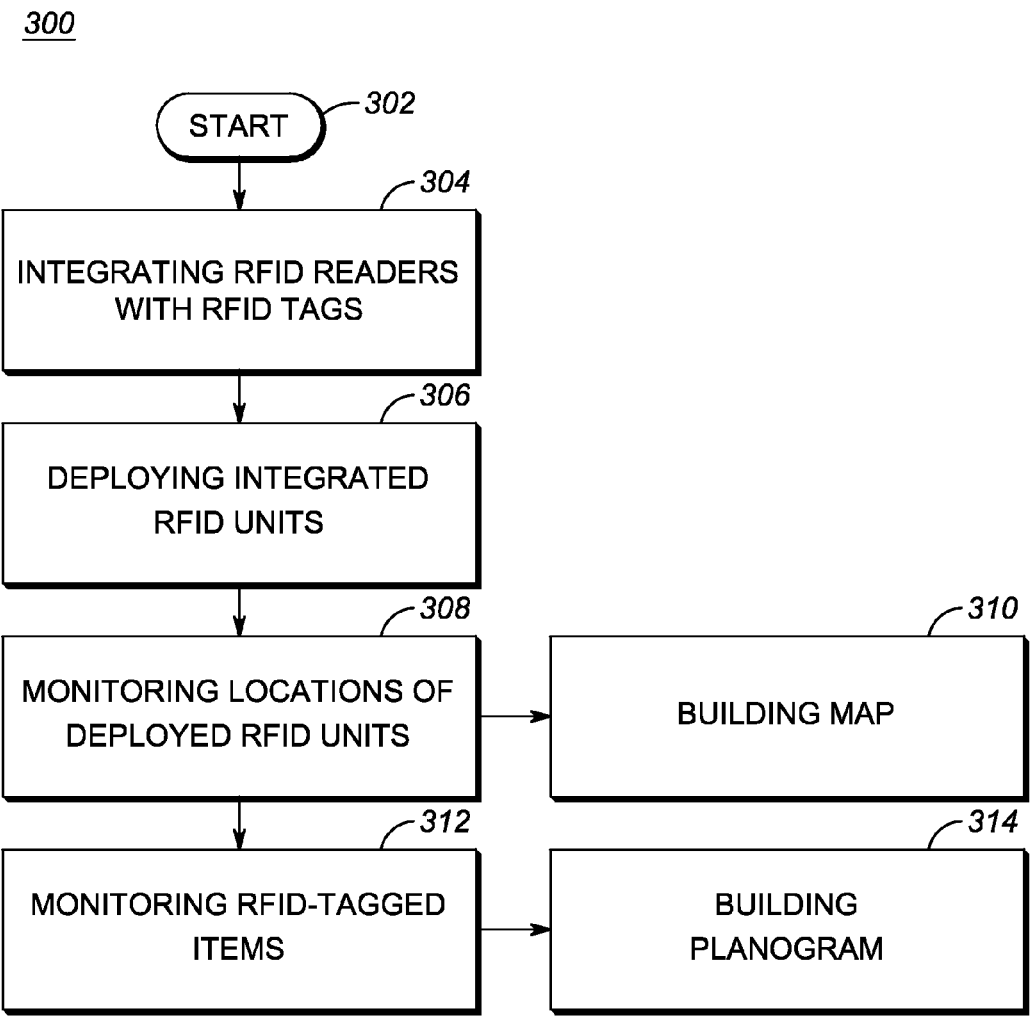
FIG. 4 is a flow chart depicting steps performed in accordance with another embodiment of a method of deploying the RFID tag readers of FIG. 1.

As shown in the flow chart 300 of FIG. 4, beginning at start block 302, each RFID reader is integrated with an RFID tag (block 304) to form an integrated RFID unit, and then, all the integrated RFID units are deployed (block 306) such that the RF coverage is optimal. The resulting contiguous RF coverage is used to allow the system 100 to track the RFID-tagged items 112, 114 in the controlled area 102 (block 312). The interface 106 conveys information concerning where to rearrange the deployed integrated RFID units 10, 12 and 14 to avoid duplicate RF coverage and gaps in the RF coverage in the controlled area. Advantageously, the controller 104 can be used to build a map of the controlled area 102, in which the locations of the deployed integrated RFID units 10, 12 and 14 in the controlled area are depicted by the interface 106 (block 310), and to build a planogram of the controlled area 102, in which the locations of the deployed integrated RFID units 10, 12 and 14 and the RFID-tagged items 112, 114 in the controlled area 102 are depicted by the interface 106 (block 314).

This is accomplished by noting the locations of the RFID units via any of the methods described above, either by automatically determining relative distances and locations between the RFID units, or by manually entering the locations of the RFID units. Then, the controller 104 can determine the locations of the RFID-tagged items by associating them with the neighboring readers that "see" them. If more than one reader sees a specific RFID-tagged item, then the controller 104 can determine the best estimate for its location by looking at the read rate, signal strength, phase variation as a function of frequency variation, or any combination of the methods mentioned herein, or any other method that may be available to determine the distance between the readers and the RFID-tagged items.

Gaps in the RF coverage can be determined by neighboring RFID units 10, 12 and 14 not seeing each other, or by not reading all the RFID-tagged items 112, 114 indicated in an existing planogram. Duplication in RF coverage can be determined by multiple RFID units 10, 12 and 14 seeing too many of the same RFID-tagged items 112, 114. A planogram is built by knowing the location of each of the RFID units 10, 12 and 14 relative to one another, and by determining which of the RFID-tagged items 112, 114 that each RFID unit sees.

Thus, the present disclosure provides convenient self-learning methods to deploy and self-optimally configure an RFID-based system with good and contiguous RF coverage in a controlled area where RFID readers are supposed to be monitoring an inventory of RFID-tagged items, especially when the layout of the controlled area 102 changes. It is valuable to provide automatic feedback about adequate RF coverage, to make recommendations about optimum placement of RFID readers either during initial deployment or in response to changes in the layout of the controlled area, to automatically direct store personnel where to optimally place the RFID readers in response to such layout changes, to automatically generate reports showing the areas where coverage is lacking so that additional RFID readers can be added to fill in the "holes", to automatically generate reports showing the areas where coverage is duplicated to remove redundant RFID readers, to pinpoint the locations of the RFID readers in the controlled area, especially if the RFID readers have initially been placed randomly throughout the controlled area, and to automatically generate a planogram of the controlled area monitored by the RFID readers, especially where a planogram does not yet exist.

As described above, the monitoring advantageously relies not only on information obtained from reading the RFID tags integrated with neighboring readers, but also on additional information from the RFID-tagged items being read by the readers. For instance, if any reader "sees" mostly men's white shirts, then it is likely that it is at, or very near, the men's white shirt rack. If a planogram of the store layout is available, then the location of the reader can be determined from the RFID-tagged items that the reader is reading predominantly. If any of the readers are powered from an electrical outlet, then that information can also be used, since the fixed location of the outlet is known. Prior knowledge of the location of any fixed reader helps to further refine the accuracy of the layout of the entire system.

Additional location information can also be obtained from a Wi-Fi transceiver system, or any other backend radio system that is capable of providing locationing information of the Wi-Fi transceiver system. Examples of methods employed by a Wi-Fi locationing system include information obtained from a reader's association with specific access points, or by using time of flight of short pulses, or phase information, or signal strength, just to mention a few.

Furthermore, the RFID tags attached to the readers can be used to locate the RFID readers for maintenance purposes. For instance, a handheld RFID reader can be used to accurately locate a fixed reader by honing in on the RFID tag attached to the fixed reader. The RFID tag attached to the reader can also be used to prevent unauthorized people from taking the RFID reader outside the controlled area.

As previously noted, although each RFID-tagged item 112, 114 can bear any type of tag, it is preferred that the tag be a passive tag for reasons of cost. Analogously, although the tags 10B, 12B, 14B and 16B can be any type of tag, it is preferred that the tag be a semi-active tag, because the longer range helps to minimize the number of the integrated units and increases the distance between the integrated units for a more efficient and optimal deployment.

The controller 104 can continuously monitor the deployment of the readers on the RFID units. In case the layout of the controlled area is changed, the controller 104 can automatically determine the optimum layout for the new changed layout. As the redeployment takes place, the controller 104 can continually and dynamically update its best estimates, and provide real-time guidance to the user to optimize the reader deployment.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. For example, it is possible to have the readers directly communicate with one another, rather than relying on tag activation. This completely different approach ensures a much larger distance between the readers, but requires the readers to be operational at the same time.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A self-optimizing method of efficiently deploying radio frequency identification (RFID) tag readers in a controlled area containing RFID-tagged items to be monitored, comprising:
   integrating the RFID tag readers with individual RFID tags to form at least three integrated RFID units;
   initially deploying the at least three integrated RFID units in the controlled area in an initial deployment in which the at least three integrated RFID units cover the controlled area with radio frequency (RF) coverage;
   determining whether the RF coverage optimally covers the controlled area by controlling each one of the at least three integrated RFID units in the initial deployment to read the respective RFID tag integrated with at least another one of the integrated RFID units, and said determining includes ascertaining whether or not each one of the at least three integrated RFID units reads the respective RFID tag integrated in at least another one of the integrated RFID units;
   reporting when the RF coverage does not optimally cover the controlled area; and
   guiding, in response to the reporting, a redeployment of at least one of the initially deployed at least three integrated RFID units to a subsequent deployment in which the RF coverage provided by the at least three integrated RFID units optimally covers the controlled area.

2. The method of claim 1, wherein the integrating of the RFID tag readers with the individual RFID tags is performed by one of attaching each individual RFID tag to a respective RFID tag reader after reader manufacture, and by incorporating each individual RFID tag in a respective RFID tag reader during reader manufacture.

3. The method of claim 1, wherein the controlling is performed by determining a distance between two of the at least three integrated RFID units by measuring at least one of a read rate value, a return signal strength indicator value, and a phase value of a reflected signal versus frequency, for the respective RFID tag of the other integrated RFID unit.

4. The method of claim 1, wherein the determining is also performed by controlling the at least three integrated RFID units to read the RFID-tagged items at known locations in the controlled area.

5. The method of claim 4, wherein the controlling of the at least three integrated RFID units to read the RFID-tagged items at known locations in the controlled area comprises determining a distance between at least one of the at least three integrated RFID units and at least one of the RFID-tagged items by measuring at least one of a read rate value, a return signal strength indicator value, and a phase value of a reflected signal versus frequency, for the at least one RFID-tagged item.

6. The method of claim 1, wherein the reporting conveys positional information concerning at least one of duplication of the RF coverage, gaps in the RF coverage, changes in layout of the controlled area, and changes in location of the RFID-tagged items.

7. The method of claim 6, wherein the reporting is performed when the positional information persists for a specified minimum duration.

8. The method of claim 1, wherein each respective individual RFID tag integrated with a respective RFID tag reader is a semi-active tag.

9. The method of claim 1, and creating a planogram of the controlled area, in which the locations of the at least three integrated RFID units and the RFID-tagged items are depicted in the controlled area.

10. A self-optimizing system for efficiently deploying radio frequency identification (RFID) tag readers in a controlled area containing RFID-tagged items to be monitored, comprising: at least three integrated RFID units formed by integrating the RFID tag readers with individual RFID tags, the at least three integrated RFID units being initially deployed in the controlled area in an initial deployment in which the at least three integrated RFID units cover the controlled area with radio frequency (RF) coverage;
- a controller for determining whether the RF coverage optimally covers the controlled area by controlling each one of the at least three integrated RFID units in the initial deployment to read the respective RFID tag integrated with at least another one of the integrated RFID units, and said determining includes ascertaining whether or not each one of the at least three integrated RFID units reads the respective RFID tag integrated in at least another one of the integrated RFID units;
- and an interface for reporting when the RF coverage does not optimally cover the controlled area, and for guiding, in response to the reporting, a redeployment of at least one of the initially deployed at least three integrated RFID units to a subsequent deployment in which the RF coverage provided by the at least three integrated RFID units optimally covers the controlled area.

11. The system of claim 10, wherein the RFID tag readers are integrated with the individual RFID tags by one of attaching each individual RFID tag to a respective RFID tag reader after reader manufacture, and by incorporating each individual RFID tag in a respective RFID tag reader during reader manufacture.

12. The system of claim 10, wherein the controller is operative for determining a distance between two of the at least three integrated RFID units by measuring at least one of a read rate value, a return signal strength indicator value, and a phase value of a reflected signal versus frequency, for the respective RFID tag of the other integrated RFID unit.

13. The system of claim 10, wherein the controller is also operative for controlling the at least three integrated RFID units to read the RFID-tagged items at known locations in the controlled area.

14. The system of claim 13, wherein the controller is operative for determining a distance between at least one of the least three integrated RFID units and at least one of the RFID-tagged items by measuring at least one of a read rate value, a return signal strength indicator value, and a phase value of a reflected signal versus frequency, for the at least one RFID-tagged item.

15. The system of claim 13, wherein the controller is operative for creating a planogram of the controlled area, in which the locations of the at least three integrated RFID units and the known locations of the RFID-tagged items are depicted in the controlled area, and wherein the interface is operative for displaying the planogram.

16. The system of claim 10, wherein the interface is operative for conveying positional information concerning at least one of duplication of the RF coverage, gaps in the RF coverage, changes in layout of the controlled area, and changes in location of the RFID-tagged items.

17. The system of claim 16, wherein the interface is operative for conveying the positional information when the positional information persists for a specified minimum duration.

18. The system of claim 10, wherein each respective individual RFID tag integrated with a respective RFID tag reader is a semi-active tag.

* * * * *